(12) United States Patent
Duplessis et al.

(10) Patent No.: US 7,776,209 B2
(45) Date of Patent: Aug. 17, 2010

(54) CONTROL METHOD AND APPARATUS FOR A WATER TREATMENT SYSTEM

(75) Inventors: Samuel Vincent Duplessis, Louisville, KY (US); Kyran P. Hoff, Louisville, KY (US); Craig R. Vitan, Louisville, KY (US); Laurence H. Fish, Prospect, KY (US); Jonathan D. Nelson, Louisville, KY (US); John Steven Holmes, Sellersburg, IN (US); Almir Begovich, Louisville, KY (US); Erik J. Matusek, Louisville, KY (US); Timothy G. Hooker, Fisherville, KY (US); Dennis J. Dicken, Louisville, KY (US)

(73) Assignee: General Electric Company, Schenectady, NY (US)

( * ) Notice: Subject to any disclaimer, the term of this patent is extended or adjusted under 35 U.S.C. 154(b) by 834 days.

(21) Appl. No.: 11/289,935

(22) Filed: Nov. 30, 2005

(65) Prior Publication Data

US 2007/0119758 A1 May 31, 2007

(51) Int. Cl.
*B01D 36/02* (2006.01)
(52) U.S. Cl. .............................. 210/85; 210/87; 210/90; 210/96.1; 210/97; 210/103; 210/134; 210/143; 210/192; 210/248; 210/259; 210/335
(58) Field of Classification Search .................. 210/85, 210/87, 90, 91, 93, 103, 104, 110, 134, 138, 210/143, 192, 259, 299, 321.6, 96.1, 149, 210/248, 252, 258, 260–262, 97, 232, 335; 422/24, 186.3; 250/435–438; 340/603, 653, 340/606, 609, 618; 73/866.5; 702/116
See application file for complete search history.

(56) References Cited

U.S. PATENT DOCUMENTS

| 1,646,581 | A | | 10/1927 | Eisenhauer |
| 2,702,636 | A | | 2/1955 | Brown |
| 4,026,801 | A | | 5/1977 | Ward |
| 4,204,956 | A | * | 5/1980 | Flatow ........................ 210/87 |
| 5,236,595 | A | * | 8/1993 | Wang et al. ................. 210/669 |
| 5,505,912 | A | * | 4/1996 | Hallett ..................... 422/186.3 |
| 5,536,395 | A | | 7/1996 | Kuennen et al. |
| 5,567,311 | A | | 10/1996 | Jang |
| 5,585,003 | A | | 12/1996 | Newenhizen |
| 5,591,344 | A | | 1/1997 | Kenley et al. |
| 5,683,576 | A | | 11/1997 | Olsen |
| 5,698,091 | A | * | 12/1997 | Kuennen et al. .............. 210/87 |
| 5,774,529 | A | | 6/1998 | Johannsen et al. |
| 5,779,911 | A | * | 7/1998 | Haug et al. ................. 210/739 |
| 5,853,572 | A | | 12/1998 | Kuennen et al. |
| 6,206,042 | B1 | | 3/2001 | Channell et al. |

(Continued)

*Primary Examiner*—Joseph W Drodge
(74) *Attorney, Agent, or Firm*—George L. Rideout, Esq.; Armstrong Teasdale LLP

(57) ABSTRACT

A modular water treatment system includes a plurality of water treatment components including selected from a group of a particulate filter component, a taste and odor filter component, a lead and mercury filter component, a water softener component, and a water disinfection component. A plurality of interfaces are provided for coupling to the selected water treatment components. Plumbing lines provide flow communication between the selected water treatment components, and the plumbing lines include a system water inlet and a system water outlet. A controller is configured to control the flow of water through the system, and a sensor is configured to transmit a signal to the controller.

23 Claims, 12 Drawing Sheets

U.S. PATENT DOCUMENTS

| | | |
|---|---|---|
| 6,228,255 B1 | 5/2001 | Peterson et al. |
| 6,379,539 B1 | 4/2002 | Ubelhor |
| 6,464,884 B1 | 10/2002 | Gadgil |
| 6,491,811 B2 | 12/2002 | Conrad et al. |
| 6,607,668 B2 * | 8/2003 | Rela ........................ 210/321.6 |
| 6,636,151 B2 | 10/2003 | Busick |
| 6,657,546 B2 * | 12/2003 | Navarro et al. .............. 340/653 |
| 6,942,785 B2 * | 9/2005 | Bayer et al. .................... 210/91 |
| 7,390,399 B2 * | 6/2008 | Dennis et al. .............. 210/96.1 |
| 7,582,198 B2 * | 9/2009 | Wilkins et al. .............. 204/522 |
| 2002/0040867 A1 | 4/2002 | Conrad |
| 2003/0080467 A1 | 5/2003 | Andrews et al. |
| 2004/0104157 A1 * | 6/2004 | Beeman et al. ............. 210/232 |
| 2005/0133459 A1 | 6/2005 | Schulz |

* cited by examiner

US 7,776,209 B2

CONTROL METHOD AND APPARATUS FOR A WATER TREATMENT SYSTEM

BACKGROUND OF THE INVENTION

This invention relates generally to water treatment systems, and, more particularly, to control methods and apparatus for in-home water treatment systems.

Water treatment devices are generally used to treat water in a home or building for human consumption. At least some known water treatment devices include a filter for filtering particles from the water. At least some other known water treatment devices include a water softener assembly for removing hardness minerals from the water. In addition, at least some known water treatment devices include taste and odor filters for reducing chlorine or odor causing material from the water. At least some other known water treatment devices include mercury and lead filters for removing mercury and lead from the water. Furthermore, at least some other known water treatment devices include disinfection devices for removing, killing or inactivating microorganisms such as bacteria, virus, cysts, protozoa, and the like from the water.

However, consumers typically purchase specific individual components to assemble an array of water treatment devices that are specific to water quality concerns of consumers. Generally, the individual devices are plumbed together to form the array of components. This array of components typically occupies a large area within a home or building. Additionally, each individual component in the array, functions independently from the other components, thus increasing the difficulty of maintaining the overall water treatment system in the consumers home or building.

BRIEF DESCRIPTION OF THE INVENTION

In one aspect, a modular water treatment system is provided including a plurality of water treatment components selected from a group of a particulate filter component, a taste and odor filter component, a lead and mercury filter component, a water softener component, and a water disinfection component. A plurality of interfaces are provided for coupling to the selected water treatment components. Plumbing lines provide flow communication between the selected water treatment components, and the plumbing lines include a system water inlet and a system water outlet. A controller is configured to control the flow of water through the system, and a sensor is configured to transmit a signal to the controller.

In another aspect, a modular water treatment system is provided including a filter component selected from a group of a particulate filter component, a taste and odor filter component, and a lead and mercury filter component, and a water disinfection component comprising an ultraviolet lamp. A plurality of interfaces are provided for coupling to the selected water treatment components. Plumbing lines provide flow communication between the selected water treatment components, and the plumbing lines include a system water inlet and a system water outlet. A controller is configured to control the flow of water through the system, and a sensor is configured to transmit a signal to the controller.

In a further aspect, a modular water treatment system is provided including a filter component selected from a group of a particulate filter component, a taste and odor filter component, and a lead and mercury filter component, and a water softener component comprising a brine tank and a resin tank, the brine tank in flow communication with a drain. A plurality of interfaces are provided for coupling to the selected water treatment components. Plumbing lines provide flow communication between the selected water treatment components, and the plumbing lines include a system water inlet and a system water outlet. A controller is configured to control the flow of water through the system, and a sensor is configured to transmit a signal to the controller.

DETAILED DESCRIPTION OF THE INVENTION

Figure 1:
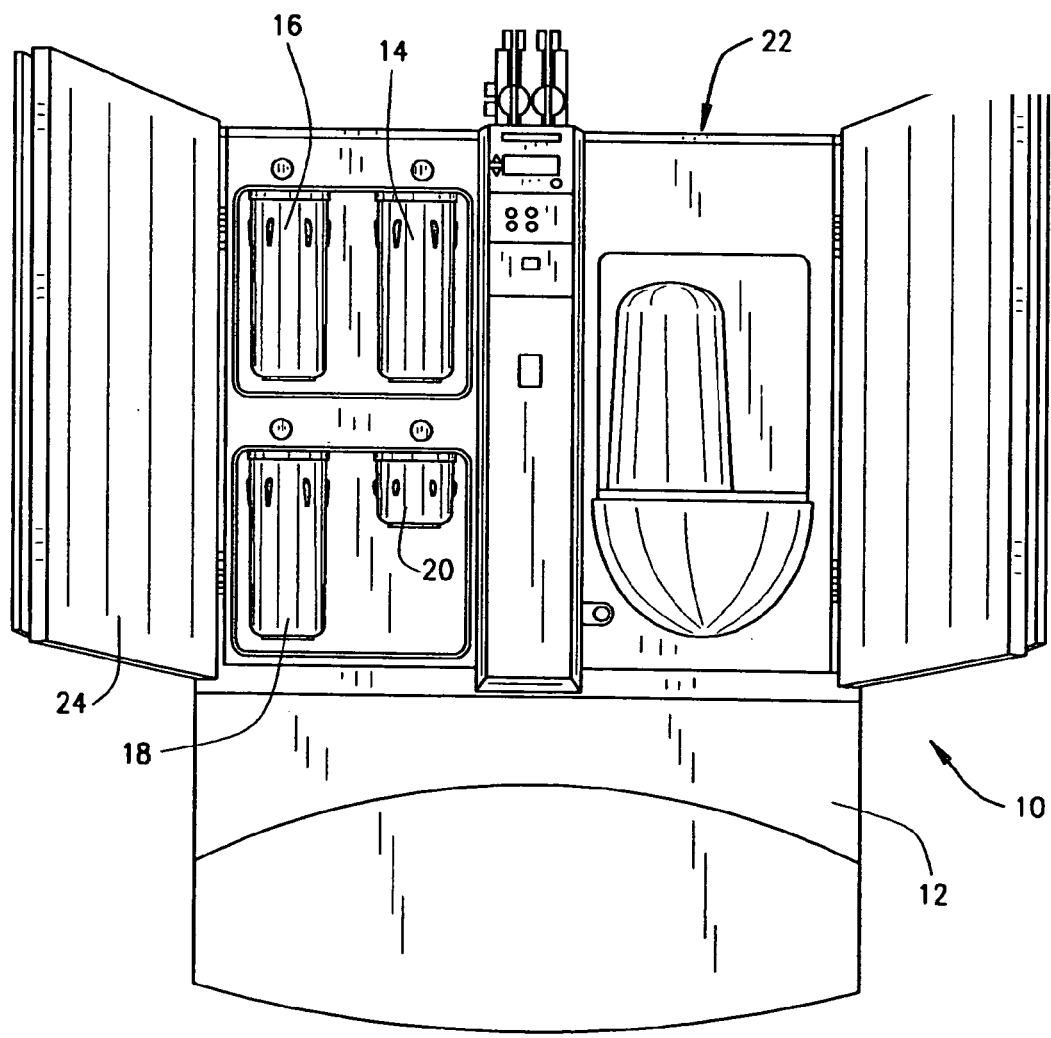
FIG. 1 is a front view of an exemplary water treatment assembly.

FIG. 1 is a front view of an exemplary water treatment assembly 10. Water treatment assembly 10 includes a housing or cabinet 12 enclosing a plurality of water treatment elements, or modules, therein. In the exemplary embodiment, water treatment assembly 10 includes a particle filter module 14 including at least one particle or sediment filter (not shown) for gross particle reduction. Assembly 10 also includes a taste and odor removal module 16 including a taste and odor filter (not shown) and a lead and mercury removal module 18 including at least one lead and mercury filter (not shown). In an alternative embodiment, water treatment assembly 10 includes less than all, or a combination of, modules 14, 16 and 18. In the exemplary embodiment, assembly 10 includes at least one additional modular compartment 20 to facilitate housing additional filter modules depending on the users particular water quality needs. Modular compartment 20 includes a by-pass sump and may be upgraded with a module similar to the other modules previously described. Alternatively, water treatment assembly 10 includes multiple modular compartments 20 that may be upgraded at a later date or in response to a determined water quality after installation of assembly 10. In the exemplary embodiment, assembly 10 includes a water softener sub-assembly 22.

Assembly 10 includes doors 24 hingedly mounted to housing 12. Doors 24 allow access to the plurality of water treatment elements. In the exemplary embodiment, doors 24 include a latch to retain doors 24 in a closed position. It is to be understood that the present invention is applicable, not only to water treatment assemblies which form a stand alone device, such as water treatment assembly 10, but to other forms of water treatment assemblies as well, such as, but not limited to, central water treatment systems. Therefore, water treatment assembly 10 is provided by way of illustration rather than limitation, and accordingly there is no intention to limit application of the present invention to any particular water treatment assembly, such as water treatment assembly 10.

Figure 2:
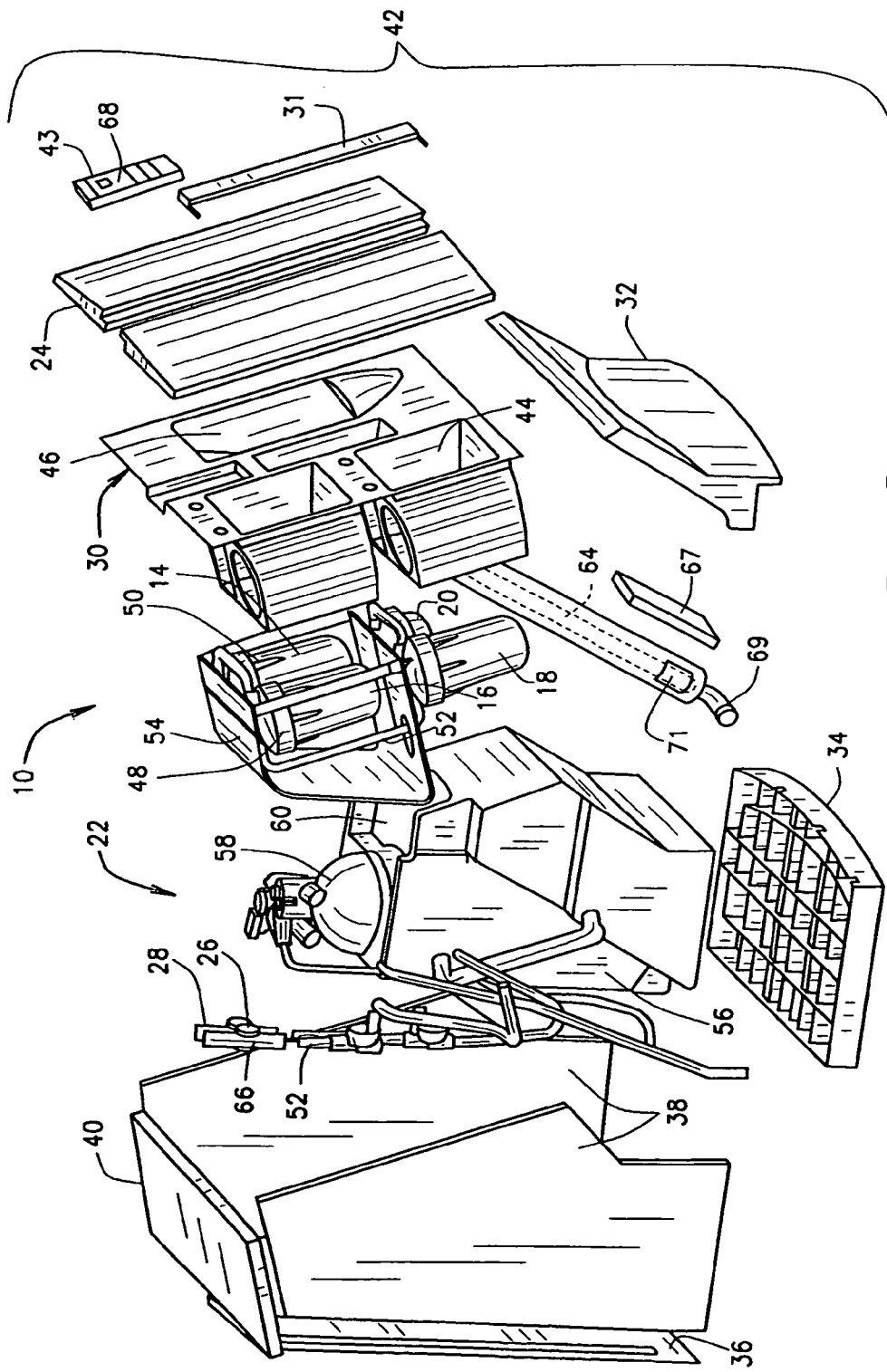
FIG. 2 is an exploded view of the water treatment assembly shown in FIG. 1.

FIG. 2 is an exploded view of water treatment assembly 10. Water treatment assembly 10 includes a main inlet 26 and a main outlet 28. Water is channeled through assembly 10 from main inlet 26, through the plurality of water treatment elements, and eventually to main outlet 28. Water is supplied to main inlet 26 from plumbing lines (not shown) in the user's home or building. The water supplied to main inlet 26 is typically below a useable quality desired by the user. Specifically, the water supplied to main inlet 26 may include particles, minerals, bacteria, and the like. Water treatment assembly 10 facilitates removing these undesirable elements to increase the quality of water consumed by the user. The water exiting assembly 10 at main outlet 28 is generally of a higher quality than the water entering assembly 10 at main inlet 26.

Housing 12 includes a front panel 30, a cabinet front 32, a base 34, a back wall 36 connected between two side walls 38, and a top cover 40. Top cover 40 may include two cover pieces for separately accessing and/or servicing the various components, such as, for example, water softener sub-assembly 22 or modular compartments 14, 16, 18 and 20. Base 34 supports the water treatment elements thereon. Doors 24 are hingedly coupled to side walls 38. Alternatively, doors 24 may be slidably coupled to side walls 38 or front panel 30. Optionally, doors 24 may be locked in the closed position. Front panel 30 cooperates with cabinet front 32 to form a front portion 42 of housing 12. Front panel 30 is removable for accessing the various water treatment elements of assembly 10. Front panel 30 includes a display 43 for displaying information to the user, such as information relating to the operational status of the various components or water treatment elements. Display 43 includes a keypad or touch screen (not shown) such that a user may interact with display 43 and thus assembly 10.

Upper and lower filter compartments 44 extend from front panel 30 and house modules 14, 16, 18 and 20. Filter compartments 44 are accessible through door 24 and are sized and oriented to allow unobstructed access to filter modules 14, 16, 18 and 20 for repair or replacement. Specifically, filter modules 14, 16, 18 and 20 are removable from filter compartments 44 without requiring that filter modules 14, 16, 18 and 20 be tilted. However, water spilled from filter modules 14, 16, 18 and 20 is caught in a catch basin of compartments 44. A water softener sub-assembly access door 46 is also positioned within front panel 30. Access door 46 is rotatably mounted to front panel 30. Alternatively, access door 46 could be slidably mounted to front panel 30. Alternatively, access door 46 could be eliminated altogether. Front panel 30 includes a disinfection module access door 31 for accessing disinfection module 62 for repair and replacement of disinfection module 62.

In assembly 10, each filter module 14, 16, 18 and 20 includes a filter support 48 for supporting a respective filter sump 50. The respective filters (not shown) are positioned within each filter sump 50. Additionally, each filter module 14, 16, 18 and 20 includes a water inlet (not shown) and a water outlet (not shown). Each filter module 14, 16, 18 and 20 is coupled in flow communication with one another, and main inlet and outlet 26 and 28, respectively, by a plurality of plumbing lines 52. Plumbing lines 52 define interfaces for the various water treatment components. Each filter module 14, 16, 18 and 20 is coupled to a filter bracket 54 which facilitates supporting and/or aligning each filter module 14, 16, 18 and 20 within compartments 44. Filter bracket 54 is coupled to top cover 40. Alternatively, each filter module 14, 16, 18 and 20 could be coupled to front panel 30.

Water softener sub-assembly 22 includes a brine tank 56, and a resin tank 58 positioned in brine tank 56. Resin tank 58 is coupled in flow communication with filter modules 14, 16, and 18, and/or other water treatment assembly elements, at an interface by plumbing lines 52. Moreover, brine tank 56 is coupled in flow communication with resin tank 58 such that brine tank 56 regenerates resin tank 58 during a regenerating cycle. Brine tank 56 includes an opening 60 positioned adjacent access door 46. Salt may be added to brine tank 56 through opening 60 and access door 46.

Water treatment assembly 10 includes a disinfection module 62 which facilitates disinfecting the water flowing through water treatment assembly 10. Specifically, disinfection module 62 substantially eliminates microbiological contaminants such as bacteria, virus, cysts and protozoa in the water. Disinfection module 62 is coupled in flow communication and interfaces with the various water treatment elements by plumbing lines 52. Disinfection module 62 is accessible through access panel 31 to facilitate removal or repair of disinfection module 62. In assembly 10, disinfection module 62 is an ultraviolet reactor and includes an ultraviolet lamp or bulb 64 emitting ultraviolet light to inactivate or kill microorganisms. In an alternative embodiment, disinfection module 62 could include a filter element (not shown) that mechanically filters the microbial contaminants.

In the exemplary embodiment, disinfection module 62 includes a control switch 65 for controlling an operation state of bulb 64. For example, control switch 65 is coupled to controller 68, and controller 68 limits or restricts power to bulb 64 based on an input from control switch 65. As such, the risk of exposure to a user is substantially reduced, if not eliminated. In the exemplary embodiment, control switch 65 is operatively coupled to doors 24 or access panel 31 and transmits a signal to controller 68 when doors 24 or access panel 31 are opened. Controller 68 restricts power to bulb 64 when doors 24 or access panel 31 is opened, thus powering down or de-energizing lamp 64 during a maintenance procedure. Alternatively, control switch 65 is coupled directly to disinfection module 62, such that manipulation of disinfection module 62, for example, during cleaning or maintenance, would restrict power to UV bulb or lamp 64.

In operation, a by-product of the light produced by bulb 64 is heat. The amount of heat in the water, and thus the temperature of the water is a function of the reactor temperature, the ambient temperature, the temperature of the incoming water, and the flow rate of the water through the reactor. The amount of heat produced in the water may be monitored by measuring the temperature of the water within or exiting the reactor and/or the temperature of the reactor surface and correlating that temperature to a temperature of the water contained within the reactor.

Controller 68 also operates based on signals generated by a sensor representative of a water temperature in water treatment assembly 10. Controller 68 controls a cooling system or process using a control algorithm to limit the heating of the water being treated, such that the water delivered to an end-user does not exceed an acceptable temperature. The cooling system includes a cooling device 67, such as a fan, which cools the reactor surface, thus extracting heat from the water. Controller 68 facilitates limiting the temperature rise of the water in the reactor while bulb 64 is on and disinfection module 62 is operating by detecting when the temperature is above a warm set point and turning on the fan. If the temperature exceeds a hot set point, representing a maximum allowable temperature, controller 68 turns lamp 64 off and turning on the fan to reduce the temperature of the water in the reactor. In another embodiment, the cooling system includes a flush valve 69, such as, for example, a micro-electro-mechanical system (MEMS) valve. The cooling system operates the flush valve based upon time, flow and/or temperature inputs. When the temperature of the water is above a threshold, controller 68 opens flush valve 69. A predetermined volume of water is flushed from the reactor, thus replacing the water in the reactor with cooler water. The volume of water may be controlled by opening the valve for a predetermined amount of time, or by measuring the volume of water flushed. For example, controller 68 includes a timer. The control algorithm checks the timer. Once the predetermined time has elapsed, flush valve 69 is opened for n seconds. The timer is reset, and the process is repeated. Additionally, when the temperature of the water or the reactor are above a predetermined amount, flush valve 69 is opened for a certain time or to flush a certain volume of water, and the timer may then be reset. The cooling system also includes a thermal shut-off device 71 coupled to lamp 64. In operation, when the temperature of the water or the temperature of lamp 64 is at or above a predetermined level, shut-off device 71 reduces or ceases power to lamp 64 until the water temperature drops below another predetermined temperature.

Water treatment assembly 10 includes a by-pass valve 66. By-pass valve 66 facilitates channeling water from main inlet 26 to main outlet 28 to by-pass each of the plurality of water treatment elements. Alternatively, by-pass valve 66 could facilitate bypassing water softener sub-assembly 22 such that water only flows through filter modules 14, 16, 18 and 20. In assembly 10, water softener sub-assembly 22 is bypassed to flush filter modules 14, 16, 18 and 20 after a filter change. Alternatively, by-pass valve 66 could facilitate bypassing filter modules 14, 16, 18 and 20 and channel water to water softener sub-assembly 22, such that water softener sub-assembly 22 may undergo a regeneration process. In assembly 10, by-pass valve 66 is an electromechanical valve which is automatically activated. Alternatively, by-pass valve 66 could be activated mechanically by a user.

Controller 68 is operatively coupled to main inlet 26, main outlet 28, and by-pass valve 66. Controller 68 facilitates controlling the flow of water through water treatment assembly 10. In the exemplary embodiment, controller 68 is coupled to filter modules 14, 16, 18 and 20, water softener sub-assembly 22, and/or disinfection module 62 for controlling and/or monitoring the flow of water therethrough. Controller 68 is also coupled to a plurality of sensors (not shown in FIG. 2) that monitor the flow of water through water treatment assembly 10, and generate signals relating to water characteristics. For example, the sensors may monitor the flow rate, pressure, or temperature of the water through assembly 10. The sensors monitor the water quality of the water channeled through assembly 10, such as by measuring water turbidity. The sensors may also monitor other characteristics of the water flowing through assembly 10. Signals are transmitted to controller 68 relating to such water characteristics, and the flow of water or the operation of the water treatment elements of assembly 10 is controlled by controller 68 in response to such signals.

In assembly 10, controller 68 is additionally coupled to display 43. Controller 68 sends signals to and/or receives signals from display 43 relating to the operational status of water treatment assembly 10. Alternatively, a user may interact with and/or controls water treatment assembly 10 via a wireless communication, such as, for example, via a wireless communication device or via the internet, or the like, which facilitates remotely monitoring assembly 10.

Water treatment assembly 10 includes housing 12, particle filter module 14, taste and odor removal module 16, lead and mercury removal module 18, one modular compartment 20, disinfection module 62, and water softener sub-assembly 22. Alternatively, the water treatment assembly could include housing 12, particle filter module 14, taste and odor removal module 16, lead and mercury removal module 18, one modular compartment 20, and water softener sub-assembly 22. In yet another embodiment, the water treatment assembly include housing 12, particle filter module 14, taste and odor removal module 16, two modular compartments 20, and water softener sub-assembly 22. Other embodiments including other combinations of water treatment assembly components are also contemplated by the present invention.

Figure 3:
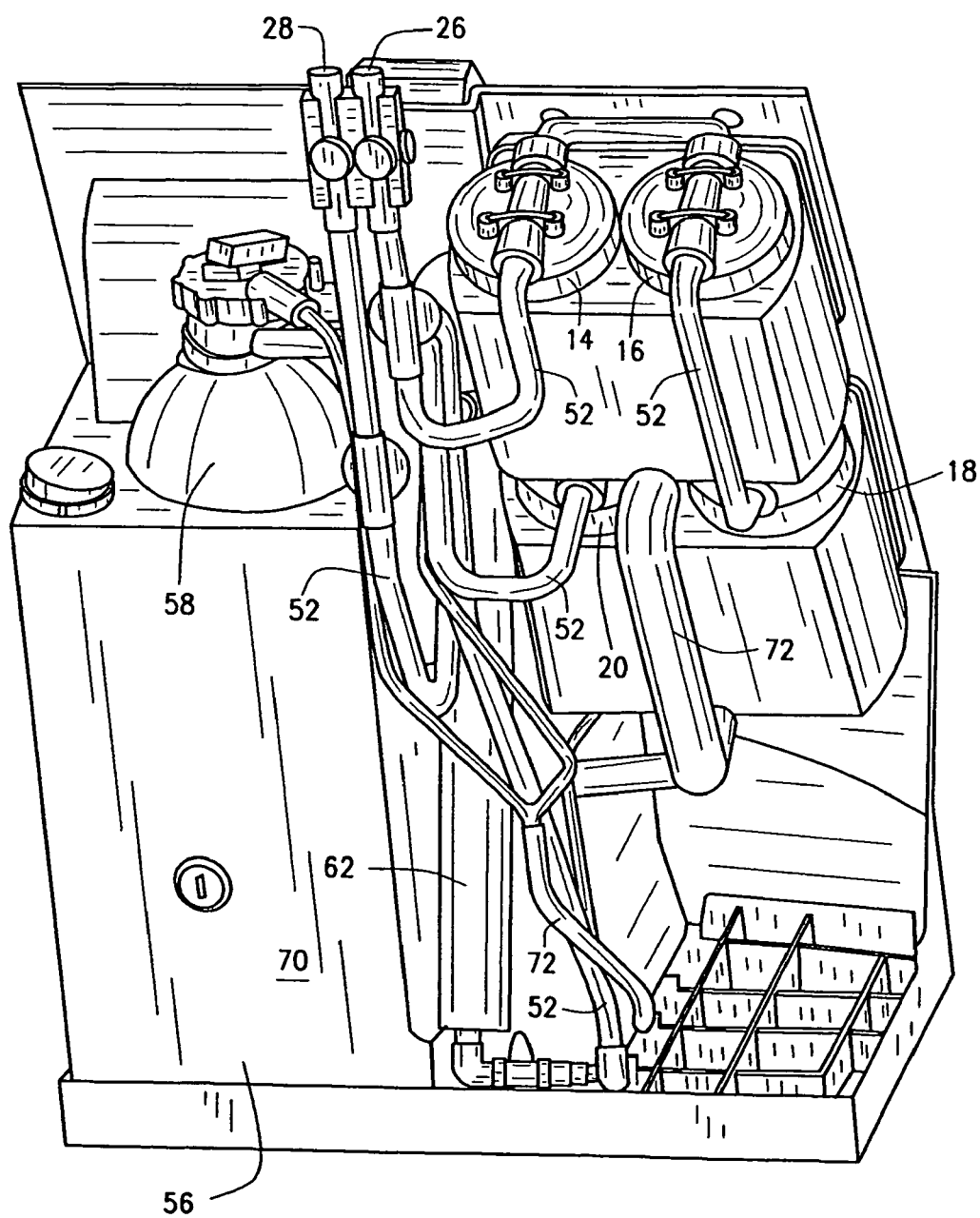
FIG. 3 is a rear perspective view of the water treatment assembly shown in FIG. 1 without a back wall and side walls.

FIG. 3 is a perspective view of a rear portion 70 of water treatment assembly 10. FIG. 3 illustrates an exemplary configuration of water treatment assembly 10 having main inlet 26, filter modules 14, 16, and 18, by-pass sump 20, water softener sub-assembly 22, disinfection module 62, and main outlet 28 arranged in series and coupled to one another by plumbing lines 52.

Particle filter module 14 is in flow communication with and positioned downstream of main inlet 26. Taste and odor removal module 16 is in flow communication with and positioned downstream of particle filter module 14. Lead and mercury removal module 18 is in flow communication with and positioned downstream of taste and odor removal module 16. Each module 14, 16 and 18 facilitates removing contaminants from the water prior to channeling water to water softener sub-assembly 22. By-pass sump 20 is in flow communication with modules 14, 16 and 18, and with water softener sub-assembly 22. Water is channeled through by-pass sump 20 and downstream therefrom to water softener sub-assembly 22. In an alternative embodiment, an additional filter element replaces by-pass sump 20 and is in flow communication with and positioned downstream of lead and mercury removal module 18. The additional filter element is used to further treat the water prior to being channeled to the water softener sub-assembly 22.

Resin tank 58 of water softener sub-assembly 22 is in flow communication with and positioned downstream of filter modules 14, 16, 18, and 20. Particulates and minerals are thus removed from the water and sediment build up in the resin within resin tank 58 is reduced. Additionally, chlorine is removed from the water, extending the life of water softener sub-assembly 22. In an alternative embodiment, filter modules 14, 16, 18, and 20 are positioned downstream of water softener sub-assembly 22. Moreover, disinfection module 62 is in flow communication with and positioned downstream of water softener sub-assembly 22. As such, additional hardness minerals are removed from the water, thereby reducing scale build up within disinfection module 62. As a result, a larger volume of water may be channeled through water softener sub-assembly 22 between regeneration and/or service cycles.

However, in alternative embodiments, disinfection module 62 is positioned upstream of water softener sub-assembly 22 and/or filter modules 14, 16, 18, and 20.

In an alternative embodiment, taste and odor removal module 16 and/or lead and mercury removal module 18 are positioned downstream of resin tank 58, and upstream of disinfection module 62. As a result, the water is first channeled through water softener sub-assembly 22, thus removing hardness minerals and extending the useful life of taste and odor removal module 16 and/or lead and mercury removal module 18.

In the exemplary embodiment, water treatment assembly 10 includes drain lines 72 extending from upper and lower filter compartments 44 to brine tank 56. Drain lines 72 facilitate draining water from respective compartments 44 to brine tank 56, such as, for example, water spilled from filter sumps 50 during a filter change. Drain lines 72 are coupled to brine tank 56 at a position above a water level of brine tank 56 during normal operating conditions, such that water does not flow from brine tank 56 into compartments 44. Drain lines 72 extend between disinfection module 62 and brine tank 56 such that water may be drained from disinfection module 62 to brine tank 56 upon servicing of disinfection module 62. Additionally, as described in more detail below, water is drained from disinfection module 62 to brine tank 56 when the temperature of the water in disinfection module 62 is above a predetermined temperature.

In use, during a filter change, filter compartment 44 captures water spilled from filter sumps 50 as filter sumps 50 are removed. Water spilled is then channeled from compartment 44 into brine tank 56 via drain lines 72. In an alternative embodiment, water spilled is channeled from compartment 44 directly into a drain. As a result of such arrangements, minimal water is spilled outside of water treatment assembly 10 during the filter change, making it more convenient for the user to maintain water treatment assembly 10. After a filter change, water is channeled through water treatment assembly 10 to flush the various water treatment elements. By-pass valve 66 is utilized to by-pass various elements such as water softener sub-assembly 22 and disinfection module 68. As described above, a drain line 72 also extends between disinfection module 62 and brine tank 56 such that water may be channeled from disinfection module 62 to brine tank 56, such as during maintenance of disinfection module 62 and/or when the temperature of disinfection module is above a predetermined amount. Additionally, when the temperature of disinfection module 62 is above a predetermined amount, water may be channeled to the drain by a bypass system.

During a regenerating cycle of resin tank 58, a predetermined amount of water in brine tank 56, including spilled water from filter compartment 44 and/or disinfection module 62, is channeled to resin tank 58 for regenerating the resin within resin tank 58. After regenerating the resin, water is channeled from resin tank 58 to the drain (not shown).

Figure 4:
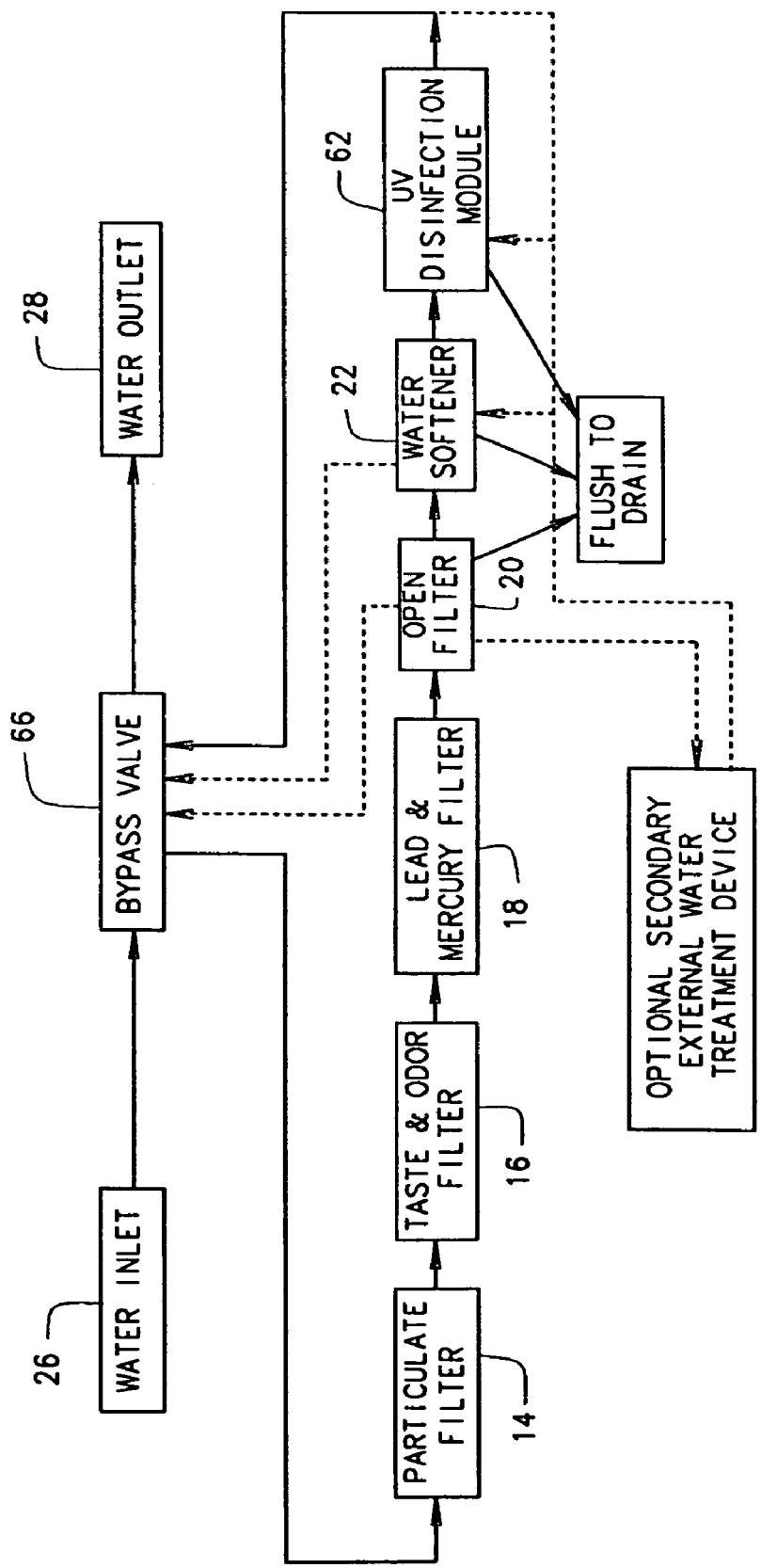
FIG. 4 is a schematic view of an exemplary water treatment flow pattern of the water treatment assembly shown in FIG. 1.

FIG. 4 is a schematic view of an exemplary water flow path through the various water treatment elements of water treatment assembly 10. Water supplied to main inlet 26 is channeled to particle filter module 14. Particle filter module 14 facilitates removing particulates, minerals, and other contaminants from the water channeled therethrough. As a result, the contaminants are not channeled through the downstream water treatment elements, thus reducing build up, blockage and/or clogging of the elements, thereby reducing the number of filter changes required.

Water is then channeled through taste and odor removal module 16 for removing chemicals such as chlorine, particles, and other contaminants causing reduced water quality relating to taste and/or odor of the water. Water is channeled through lead and mercury removal module 18 for removing minerals and metals, specifically lead and mercury, from the water. More specifically, lower quantities of minerals and metals such as lead and mercury in the water leads to higher quality water for the end user. Additionally, water is channeled through modular compartment 20, and more particularly, the bypass sump of modular compartment 20. In the exemplary embodiment, a flush valve is positioned downstream of modules 14, 16 and 18 and compartment 20 for directing water to a drain. The filters in modules 14, 16 and 18 and compartment 20 may be flushed without sending the water through water softener sub-assembly 22.

After water is channeled through modules 14, 16 and 18 and compartment 20, the water is channeled through water softener sub-assembly 22, and particularly resin tank 58, for removing hardness minerals from the water. More specifically, lower quantities of hardness minerals in the water leads to higher quality water for the end user.

Water is then channeled through disinfection module 62 for removing, killing or inactivating contaminants such as bacteria, virus, cysts, protozoa, other microbes, and the like from the water. Specifically, disinfection module 62 includes ultraviolet lamp 64 which produces ultraviolet light for reducing, and in some instances, substantially eliminating bacteria, virus, cysts, protozoa, other microbes, and the like from the water. In the exemplary embodiment, disinfection module 62 is positioned downstream of the other water treatment elements to prevent scale build up within disinfection module 62. Water is then channeled from disinfection module 62 to bypass valve 66 and main outlet 28. In alternative embodiments, water may be channeled to bypass valve 66 from water softener sub-assembly 22 or from modules 12, 16 and 18 and compartment 20. As such, at least some of the downstream components may be bypassed.

In another embodiment, water is channeled from the various water treatment elements to a drain. Specifically, the drain is in flow communication with water treatment assembly 10. Excess water from the various components, such as, for example, water softener sub-assembly 22, disinfection module 62, filter modules 14, 16 or 18, and open compartment 20 is channeled to the drain. In the exemplary embodiment, the water is channeled into brine tank 56, and the excess water is then channeled to the drain. In another embodiment, excess water within brine tank 56 and/or resin tank 58 produced during a regeneration sequence is channeled to the drain.

Figure 5:
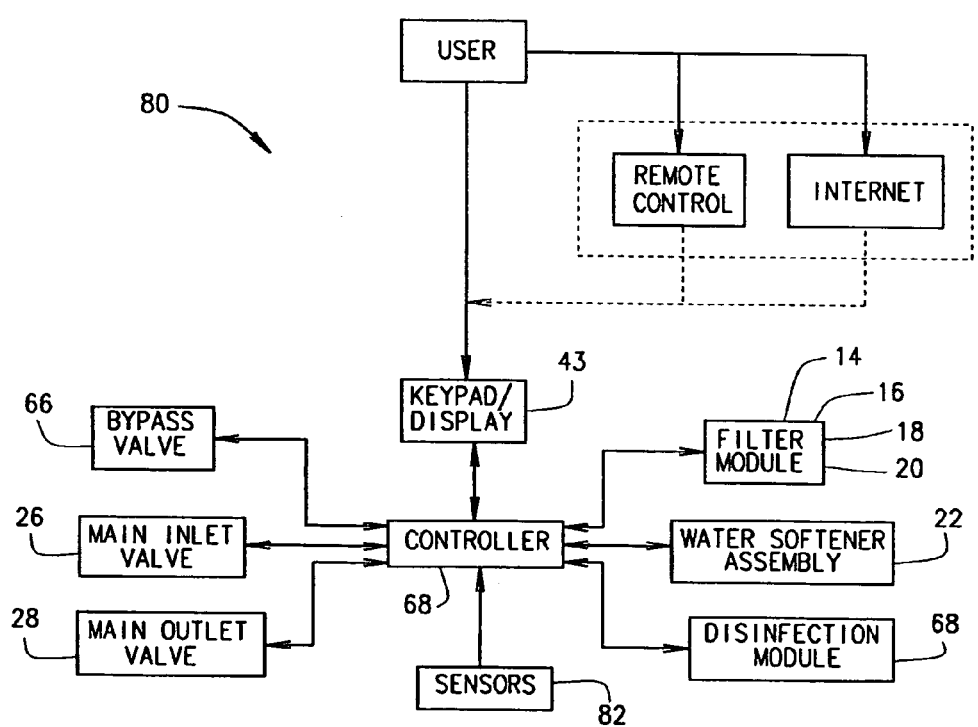
FIG. 5 is a schematic view of an exemplary control system applicable to the water treatment assembly shown in FIG. 1.

FIG. 5 is a schematic view of an exemplary control system 80 applicable to water treatment assembly 10. Control system 80 is controlled by controller 68. As described above, controller 68 is coupled to the various water treatment elements. Specifically, in the exemplary embodiment, controller 68 is operatively coupled to valves at main inlet 26, main outlet 28, and by-pass valve 66. Additionally, controller 68 is coupled to sensors 82 within water treatment assembly 10. Controller 68 is also operatively coupled to filter modules 14, 16, 18 and 20, water softener sub-assembly 22, and/or disinfection module 62. For example, controller 68 may be coupled to control valves (not shown) of each water treatment element. In the exemplary embodiment, controller 68 is coupled to display 43 and information relating to the operational status of the various water treatment elements is transmitted to display 43, such that a user may view such information. Controller 68 monitors the system functions, filter capacity and the flow of water through each component of water treatment assembly 10 and transmits signals to display 43 relating to such activities. Additionally, user inputs entered via the touch pads or touch screen of display 43 to initiate control functions and/or status queries are transmitted to controller 68.

As described above, water treatment assembly 10 includes a plurality of sensors 82 monitoring the operational status of the water treatment elements and the status of the water channeled through plumbing lines 52 (shown in FIG. 2). In the exemplary embodiment, sensors 82 include flow rate sensors, pressure sensors, or sensors configured to determine an amount of contaminants within the water. Each sensor 82 transmits a signal to controller 68 when a predetermined condition is met, such as, for example, when the flow rate of the water is below or above a predetermined amount, when the water pressure drop across a filter or the system is above a predetermined amount, or when a predetermined amount of contaminants is detected by sensor 82. In the exemplary embodiment, controller 68 alerts a user of such predetermined condition by displaying such information on display 43, or by sounding an alarm relating to such condition. Additionally, controller 68 prevents certain non-critical alarms during a pre-selected time period, i.e. during the night time.

Over time, the various the operating efficiency of the water treatment elements may decrease to a point near or even below a desired working capacity or rated capacity of the element. Water treatment assembly 10 monitors the efficiency and effectiveness of the elements and indicates to a user when the various elements need replacement or maintenance. Additionally, water treatment assembly 10 may restrict water flow to a user if the water quality is below a predetermined threshold. In the exemplary embodiment, controller 68 is operatively coupled to by-pass valve 66, and controls the operation thereof. In the exemplary embodiment, controller 68 activates by-pass valve 66 to divert the waterflow from water treatment assembly 10 when sensors 82 detect that one of the water treatment elements is beyond the working capacity. The water is diverted to a drain such that the water is not delivered to a user. Alternatively, rather than activating by-pass valve 66, controller 68 shuts down water treatment assembly 10 upon detection that one of the water treatment elements is beyond the working capacity. As such, water having a reduced quality is not delivered to the user. In another embodiment, controller 68 activates by-pass valve 66 to bypass resin tank 58 of water softener sub-assembly 22 when flushing filter modules 14, 16, and 18 upon a filter change. Alternatively, controller 68 transmits a signal to display 43 to indicate to a user that by-pass valve 66 should be mechanically activated.

Figure 6:
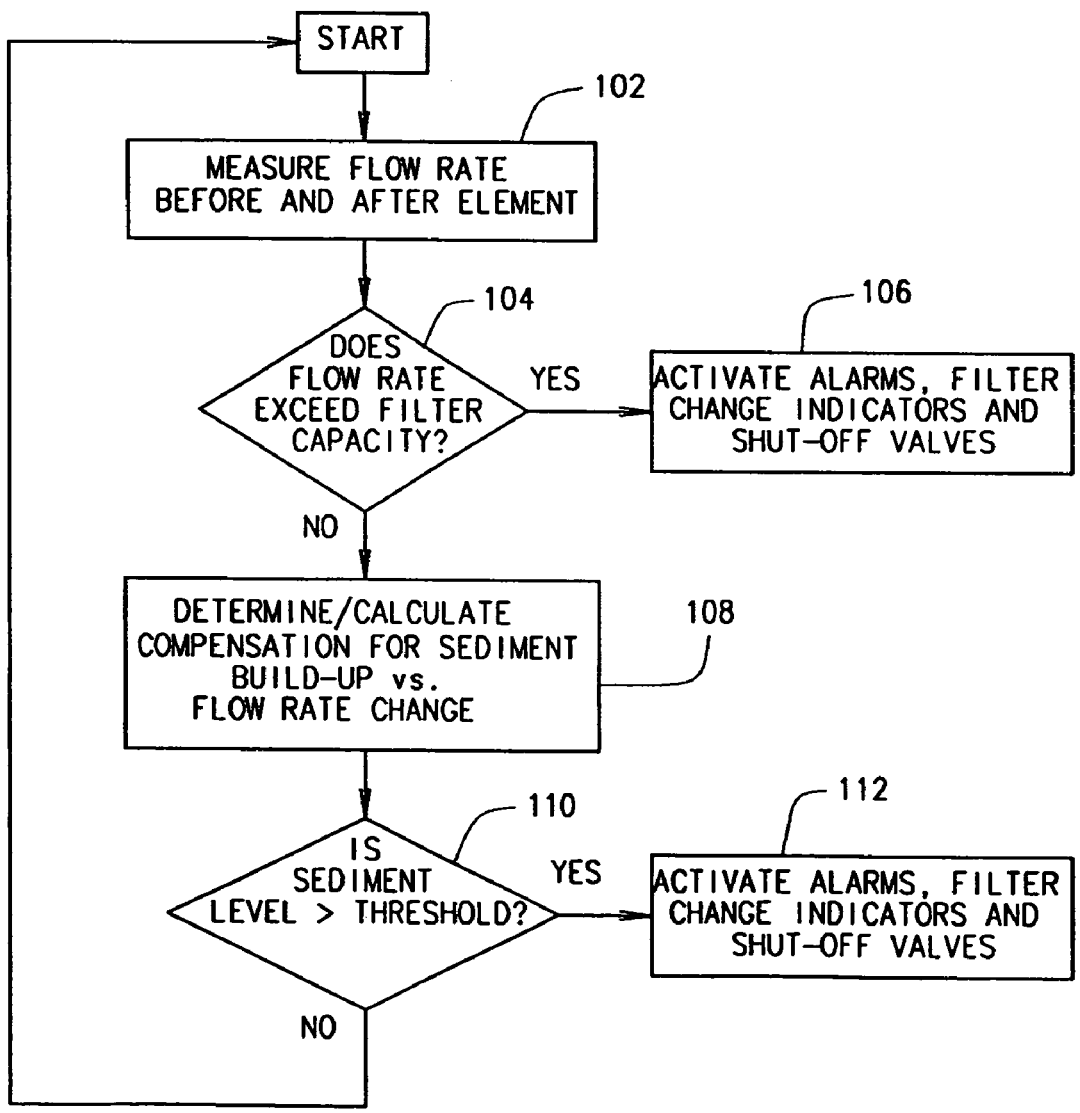
FIG. 6 is a flow diagram illustrating an exemplary control scheme of a controller for the control system shown in FIG. 5.

FIG. 6 is a flow diagram illustrating an exemplary control scheme of controller 68. Sensor 82 is a flow meter and measures total flow of water through a particular water treatment element. The flow meter is coupled to a plumbing line 52 upstream of the element. Alternatively, the flow meter may be downstream of the element. The flow meter determines a flow rate of the water through such water treatment element by measuring 102 the flow rate. Sensor 82 then transmits a signal to controller 68 based on the measured flow rate. Controller 68 determines a total amount of flow through each element. Controller 68 then determines 104 if the flow rate exceeds a filter capacity. If the capacity is exceeded, then an alarm or filter change indicator is activated 106. Additionally, controller 68 activates a valve to shut off flow to or from the particular water treatment element. If the capacity is not exceeded, controller 68 determines or calculates 108 an operational state of the element, such as a level of sediment collected in the element, and determines whether or not to replace the corresponding element. For example, controller 68 determines 110 the amount of sediment build up based on an amount of flow, such as a volume of water, through the particular water treatment element. When the total flow exceeds the rated capacity of the element or when the determined sediment level is above a predetermined amount, then controller 68 determines that the element needs to be replaced. An alarm or filter change indicator is activated 112, and/or a valve to shut off flow to or from the particular water treatment element is activated.

Figure 7:
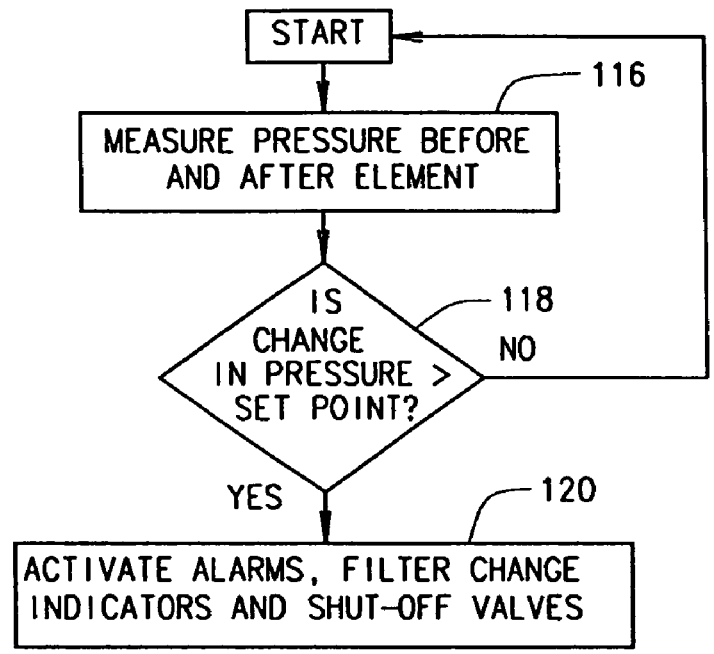
FIG. 7 is a flow diagram illustrating another exemplary control scheme of a controller for the control system shown in FIG. 5.

FIG. 7 is a flow diagram illustrating another exemplary control scheme of controller 68. Sensor 82 is a water pressure sensor. Each water pressure sensor is coupled to a plumbing line 52 both upstream and downstream of a particular water treatment element. The pressure sensor determines a change in pressure of the water through such water treatment element by measuring 116 the pressure upstream and downstream of the element. Sensor 82 then transmits a signal to controller 68 based on the measured pressure. Controller 68 determines an amount of pressure reduction or change in pressure of the water through the element. Controller 68 then determines 118 if the change in pressure is above a predetermined set point. Controller 68 thus detects an operational state of the element, such as a level of sediment collected in the element, and determines whether or not to replace the corresponding element by determining a change in pressure through the element. If the change in pressure is above the set point, then controller 68 determines that the element is clogged and needs to be replaced. An alarm or filter change indicator is activated 120, and/or a valve to shut off flow to or from the particular water treatment element is activated.

Figure 8:
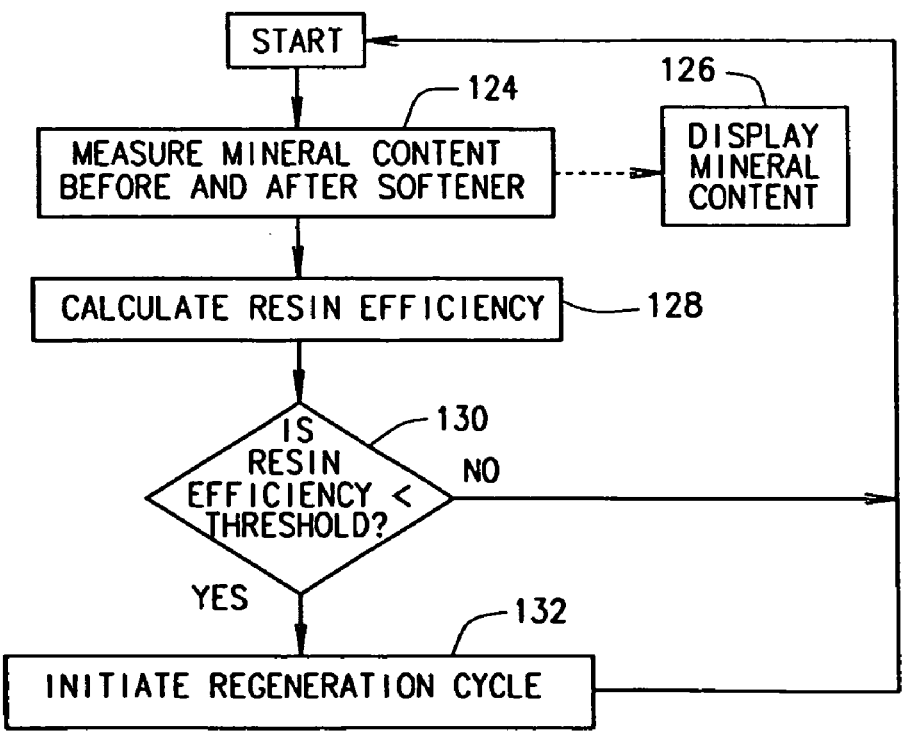
FIG. 8 is a flow diagram illustrating a further exemplary control scheme of a controller for the control system shown in FIG. 5.

FIG. 8 is a flow diagram illustrating a further exemplary control scheme of controller 68. Sensor 82 is a water softener monitoring sensor. The water softener monitoring sensor measures 124 incoming and outgoing water mineral content or water hardness. Optionally, the mineral content level is displayed 126. Sensor 82 transmits a signal to controller 68 relating to the measured mineral contents, and controller 68 determines when the resin in resin tank 58 requires regeneration based on the measured mineral content. Controller 68 thus controls the operational mode of water treatment assembly 10 to perform a regeneration cycle. For example, controller 68 calculates 128 a resin efficiency, such as a resin loading or a remaining capacity, based on a change in mineral content and determines 130 if the level is below a predetermined threshold. Alternatively, controller 68 calculates 128 a resin efficiency based on a measured mineral content downstream of water softener sub-assembly 22. If the efficiency is below a threshold level, then controller 68 will initiate 132 a regeneration cycle.

In the exemplary embodiment, because water disinfection module 62 is downstream of water softener sub-assembly 22 and may be negatively impacted by organic compounds in the water, such as by the organic compounds absorbing UV light and reducing the efficiency of water disinfection module 62, resin tank 58 is regenerated. For example, a regeneration cycle is performed after water softener sub-assembly 22 operates for a predetermined amount of time, or if water softener sub-assembly 22 has been idle for a predetermined amount of time. In another embodiment, a regeneration cycle is performed after water softener sub-assembly 22 has treated a predetermined volume of water. Alternatively, a regeneration cycle is performed based on a measured amount of organic compound in the water. As a result of regeneration, the resin in resin tank 58 is flushed and the amount of organic compounds in the water is decreased. Disinfection module 62 is not overloaded and operates efficiently. In other embodiments, the amount of organic compounds is reduced by draining or filtering the water from resin tank 58.

Figure 9:
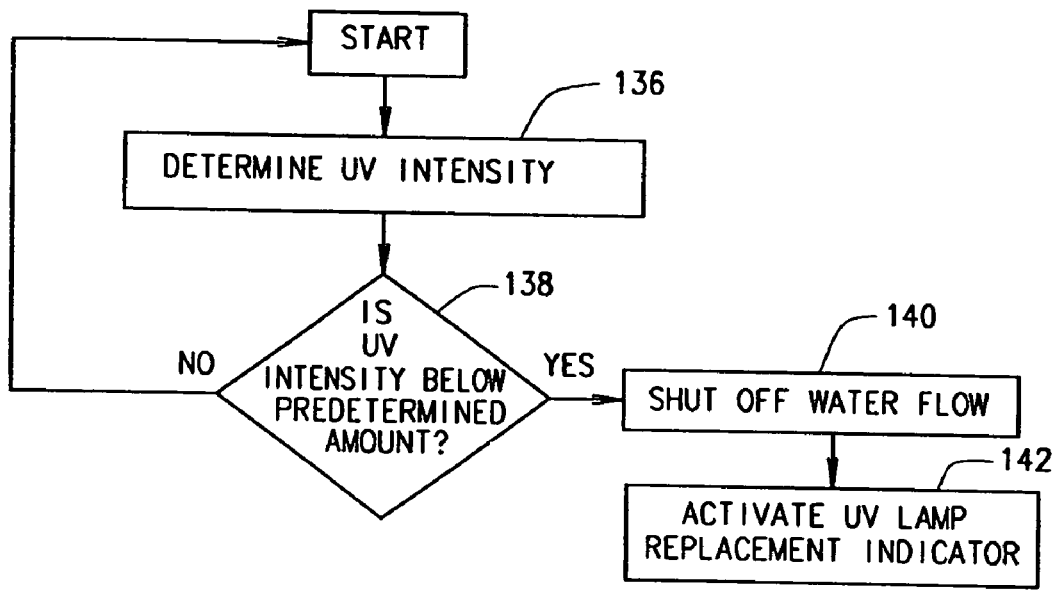
FIG. 9 is a flow diagram illustrating yet another exemplary control scheme of a controller for the control system shown in FIG. 5.

FIG. 9 is a flow diagram illustrating yet another exemplary control scheme of controller 68. Sensor 82 is a water disinfection element sensor. Sensor 82 determines 136 an ultraviolet light level or an intensity of ultraviolet lamp 64. Controller 68 then determines 138 if the level is below a predetermined amount. If the level is below a predetermined amount, water flow from water treatment assembly 10 is shut off 140. In the exemplary embodiment, an ultraviolet lamp replacement indicator is activated 142 based on the level determined by controller. For example, an alarm may be sounded or an LED may be activated indicated maintenance is required. Additionally, by comparing intensity values over time, lamp degradation is monitored by controller 68.

In an alternative embodiment, sensor determines 136 an amount of microbes within the water downstream of disinfection module 62 and transmits a signal relating to the amount of microbes to controller 68. For example, sensor 82 is a particle sensor or a turbidity sensor. Controller 68 thus determines an operational status or efficiency of ultraviolet lamp 64 (shown in FIG. 2) and when ultraviolet lamp 64 needs to be replaced or the system cleaned. For example, controller 68 determines 138 if the microbe level is above a predetermined amount. If the level is above a predetermined amount, water flow from water treatment assembly 10 is shut off 140. Alternatively, an intensity of ultraviolet lamp 64 may be changed to reduce the amount of microbes in the water. An ultraviolet lamp replacement indicator is activated 142 based on the level determined by controller. For example, an alarm may be sounded or an LED may be activated indicated maintenance is required.

In another alternative embodiment, sensor 82 determines an efficiency level of a mechanical microbiological disinfection filtration media. Specifically, sensor 82 measures a pressure differential across the filtration membrane or sensor 82 measures a particle count in the water before and after filtration. In one embodiment, controller 68 shuts off the flow of water if the UV level is below a predetermined amount.

Figure 10:
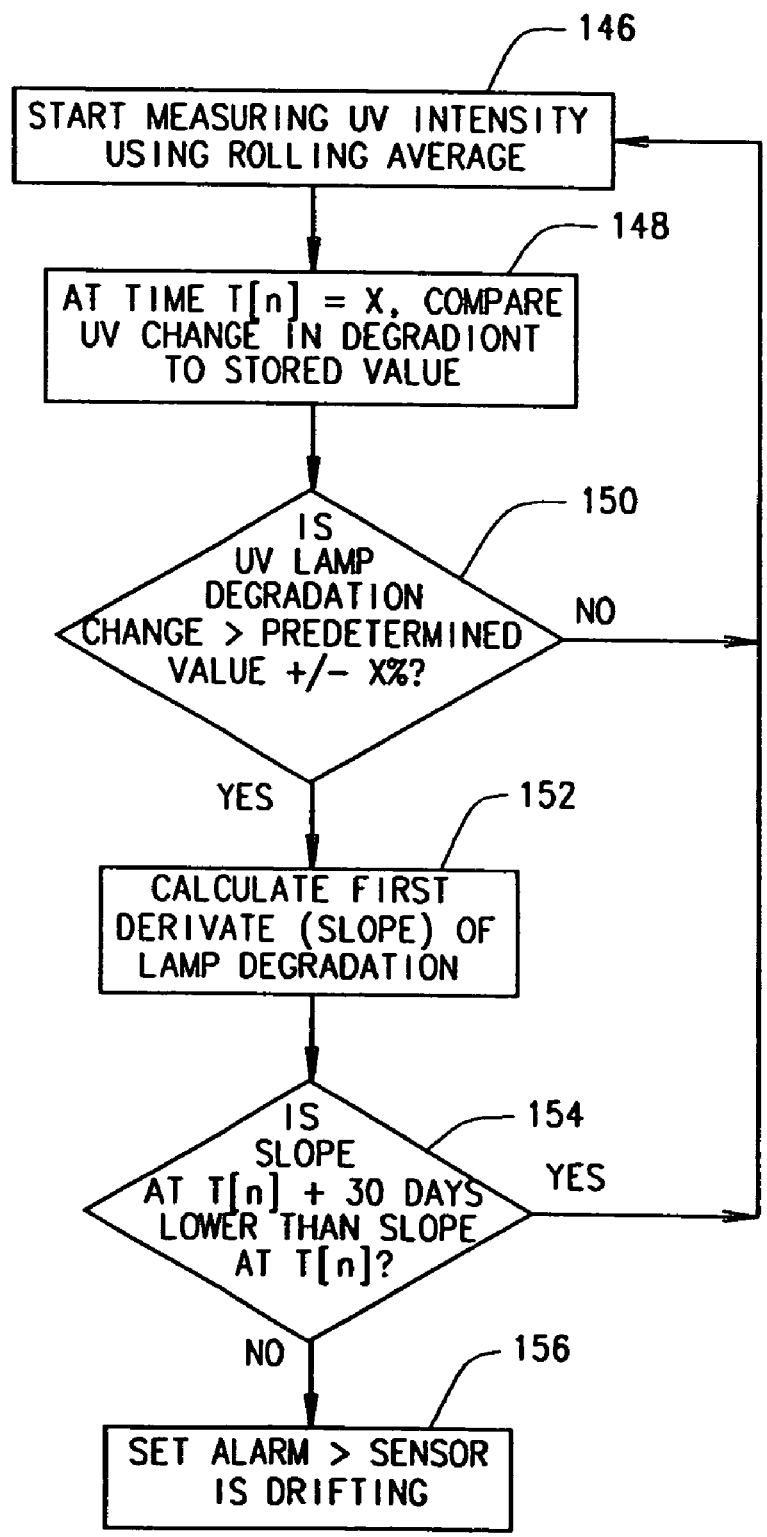
FIG. 10 is a flow diagram illustrating another exemplary control scheme of a controller for the control system shown in FIG. 5.

FIG. 10 is a flow diagram illustrating another exemplary control scheme of controller 68. Controller 68 may be used to detect sensor drift. For example, sensor 82 is a light intensity sensor, and sensor 82 measures 146 an intensity of ultraviolet lamp 64. Controller 68 stores the measured values. In the exemplary embodiment, sensor 82 is used to measure sensor drift to diagnose a faulty sensor. A rolling average of lamp intensity is computed by controller 68. The rolling average is used for determining lamp degradation over time. At time T(n)=X, the change in lamp degradation is compared 148 to a stored value based on the particular lamp 64 used. The stored value is based on manufacturer's specifications. Controller 68 determines 150 if the change in lamp degradation is greater than the stored value, within a certain percentage. If the change is greater than the stored value, then a first derivative of the lamp degradation is calculated 152. Controller 68 then determines 154 if the derivative is greater than the derivative of the store value at a future time, such as in 30 days. If the derivative is greater than the stored value of the future derivative, then controller 68 activates 156 an alarm or an indicator that the sensor is drifting. In an alternative embodiment, lamp 64 is pulsed, and the intensity is measured when the lamp power is on, when the lamp power is off, and when the lamp power is on again. The intensity values are compared to determine if the sensor is drifting.

Figure 11:
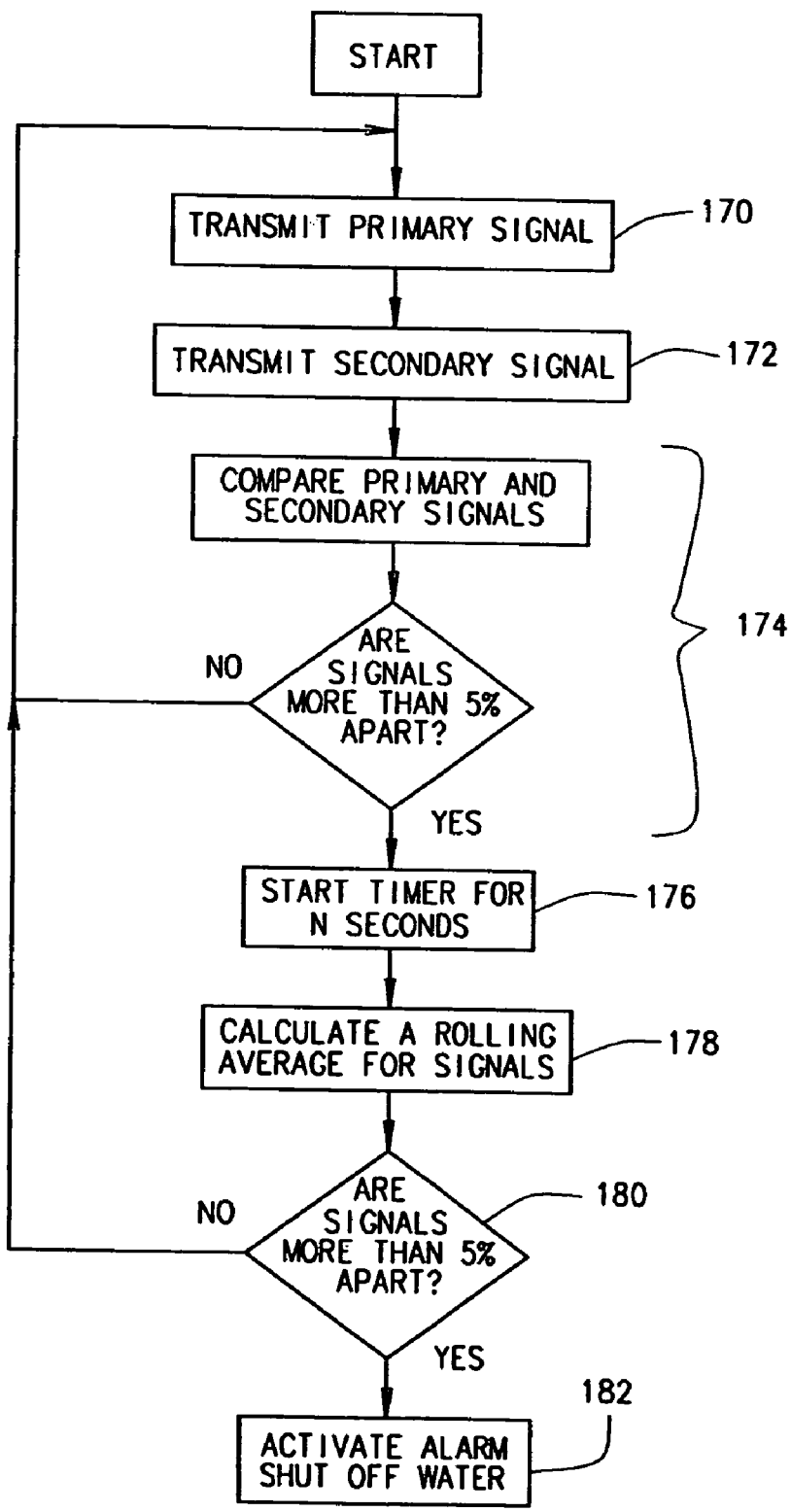
FIG. 11 is a flow diagram illustrating a further exemplary control scheme of a controller for the control system shown in FIG. 5.

FIG. 11 is a flow diagram illustrating a further exemplary control scheme of controller 68. The control scheme is related to a backup system that determines if sensor 82 is faulty, if controller 68 is faulty, or if the signals or transmissions between sensor 82 and controller 68 is faulty. Sensor 82 is a light intensity sensor, such as, for example, a photodiode, and sensor 82 measures 146 an intensity of ultraviolet lamp 64.

Sensor 82 transmits 170 a signal to controller 68, which functions as a primary controller. A signal relating to the light intensity is also transmitted 172 to a secondary or backup controller (not shown). In the exemplary embodiment, both signals are generated by the same sensor 82. In an alternative embodiment, the signals are generated by different sensors 82. The intensity signals are compared 174 with one another. If the signals are different from one another by more than a predetermined amount, such as, for example, five percent, then a timer is started 176 for N seconds. A rolling average of each signal is calculated 178. After N seconds, the average signals are compared 180. If the signals are different from one another by more than a predetermined amount, such as, for example, five percent, then controller 68 activates 1182 an alarm or an indicator and/or shuts off water flow.

Figure 12:
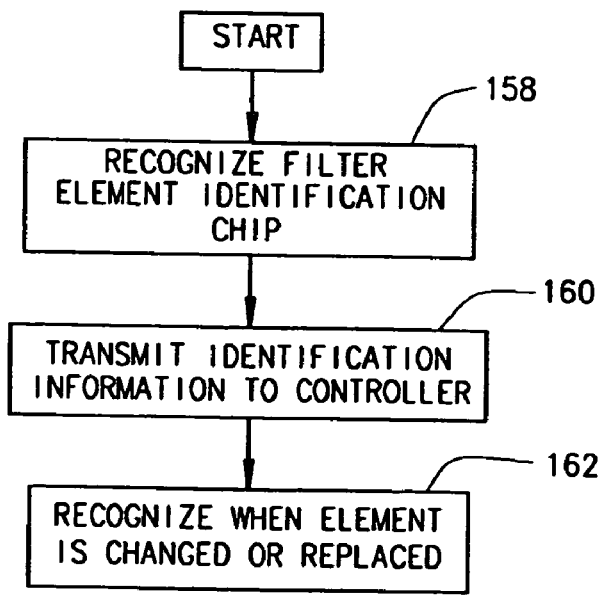
FIG. 12 is a flow diagram illustrating yet another exemplary control scheme of a controller for the control system shown in FIG. 5.

FIG. 12 is a flow diagram illustrating yet another exemplary control scheme of controller 68. Sensor 82 is a filter identification sensor. The identification sensor recognizes 158 an identification chip (not shown) embedded within a particular water treatment element. The identification sensor recognizes the identification chip on the element and transmits 160 a signal with the identification information to controller 68. Controller 68 automatically recognizes the presence and/or type of element included in water treatment assembly 10. Controller 68 also recognizes 162 when the element is changed, and/or when a new element is installed into water treatment assembly 10. For example, the identification chip may include information relating to a date of manufacture, a date of installation or first use, or a capacity or use of the element, such as an amount of water channeled through the element. When a new element is installed, the identification chip indicates to the sensor that the element is a new element. Alternatively, a bar code could be used and the sensor could be a bar code reader.

Figure 13:
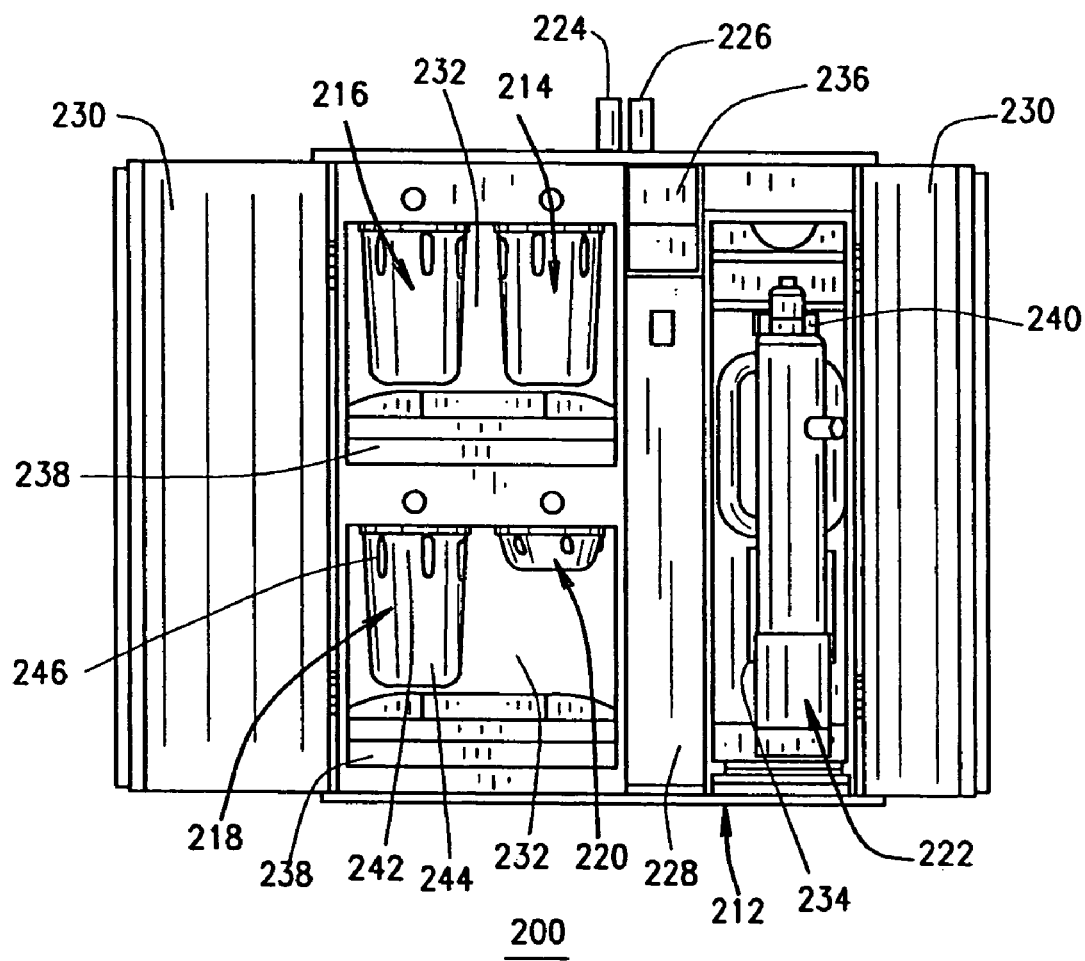
FIG. 13 is a front view of an alternative water treatment assembly.

FIG. 13 is a front view of an alternative embodiment, water treatment assembly 200. Water treatment assembly 200 includes a housing or cabinet 212 enclosing a plurality of water treatment elements, or modules, therein. Water treatment assembly 200 includes a particle filter module 214 including at least one particle or sediment filter (not shown), a taste and odor removal module 216 including a taste and odor filter (not shown), a lead and mercury removal module 218 including at least one lead and mercury filter (not shown), and an additional compartment 220 for mounting additional filter modules depending on the user's particular water quality needs. Assembly 200 also includes a disinfection module 222. In yet another alternative embodiment, disinfection module 222 could be deleted.

In contrast to water treatment assembly 10 (shown in FIG. 1), water treatment assembly 200 does not include a water softener disposed within housing 212. It is appreciated, however, that assembly 200 may be connected to a free standing water softener (not shown) located outside assembly 200 by plumbing lines (not shown). Therefore, water treatment assembly 200 is provided by way of illustration rather than limitation, and accordingly there is no intention to limit application of the present invention to any particular water treatment assembly, such as water treatment assembly 200.

Water treatment assembly 200 is wall mounted, and includes a main inlet 224 and a main outlet 226. Water is channeled through assembly 200 from main inlet 224, through the plurality of water treatment elements, and eventually to main outlet 226. Water supplied to main inlet 224 is typically below a useable quality desired by the user, and water treatment assembly 200 facilitates removing at least some undesirable elements from the water channeled therethrough to increase the quality of the water.

Housing 212 includes two doors 230 hingedly coupled thereto. Alternatively, doors 230 may be slidably coupled to housing 212. Housing 212 further includes an upper and a lower filter compartment 232 defined in a left portion thereof, a disinfection module compartment 234 defined in a right portion thereof, and a display 236 for displaying information to the user, such as information relating to the operational status of the various water treatment elements. When doors 230 are closed, doors 230 cover filter compartments 232 and disinfection module compartment 234, respectively.

Upper and lower filter compartments 232 receive modules 214, 216, and 218 therein, respectively. Filter compartments 232 are accessible through doors 230, and are sized and oriented to allow unobstructed access to filter modules 214, 216, and 218 for repair or replacement of filter modules 214, 216, and 218. Specifically, filter modules 214, 216, and 218 are removable from filter compartments 232 without tilting of filter modules 214, 216, and 218. Each filter compartment 232 includes a tray 238 removably positioned therein and located below each module 214, 216, and 218. Each tray 238 facilitates collecting water spilled from modules 214, 216, and 218 during a filter change. Spilled water is collected in tray 238, and tray 238 may be removed from filter compartments 232 to discard collected water into a drain (not shown).

Disinfection module compartment 234 is accessible through doors 230, and receives disinfection module 222 therein. Disinfection module compartment 234 includes a latch or clamp 240 extending outward therefrom. Latch 240 may hold a portion of disinfection module 222 in a snapping manner, such that disinfection module 222 is substantially vertically positioned in module compartment 234. It is appreciated, however, that the location and the structure of latch 240 may be varied in alternative embodiments.

Each filter module 214, 216, and 218 includes a filter support 242 for supporting a respective filter sump 244. The respective filters (not shown) are positioned within each filter sump 244. Each filter module 214, 216, and 218 is coupled in flow communication with one another, and main inlet and outlet 224 and 226, respectively, by a plurality of plumbing lines (not shown). Each filter sump 244 is threadably coupled to the corresponding filter support 242. Each filter sump 244 further includes a plurality of holding ribs 246 extending outward from an outer surface 248 thereof. Holding ribs 246 facilitate grasping filter sump 244 such that filter sump 244 may be rotated with respect to corresponding filter support 242 for mounting or removal therefrom. Filter sumps 244 may be removed without tilting, thus reducing spillage during filter changes.

Due to the limited space within module compartment 234, the disinfection elements may not be removable from disinfection module 222 for maintenance or replacement or removal may be difficult. As such, disinfection module 222 is rotatably positioned within disinfection module compartment 234, and is accessible from the front of housing 212. Disinfection module 222 is coupled in flow communication with the various water treatment elements, and/or main inlet and outlet 224, 226 by the plumbing lines (not shown), and includes a plurality of disinfection elements which facilitate disinfecting the water flowing therethrough. Disinfection module 222 is held by latch 240 of module compartment 234, and is substantially vertically secured within module compartment 234, which is referred to as a normal state or operational state of disinfection module 222. In the operational state, disinfection module 222 occupies most of the space within module compartment 234 along the longitudinal direction. As such, the disinfection elements can not be removed when disinfection module 222 is in the operational state.

Water treatment assembly 200 includes housing 212, particle filter module 214, taste and odor removal module 216, and two modular compartments 220. In another embodiment, water treatment assembly 210 includes housing 212, particle filter module 214, taste and odor removal module 216, lead and mercury removal module 218, and one modular compartment 220. In yet another embodiment, water treatment assembly 210 includes housing 212, particle filter module 214, taste and odor removal module 216, lead and mercury removal module 218, one modular compartment 220 and disinfection module 222. However, other embodiments including combinations of water treatment assembly components are available, such as a water softener sub-assembly, or a valve for receiving plumbing lines for a water softener sub-assembly.

Figure 14:
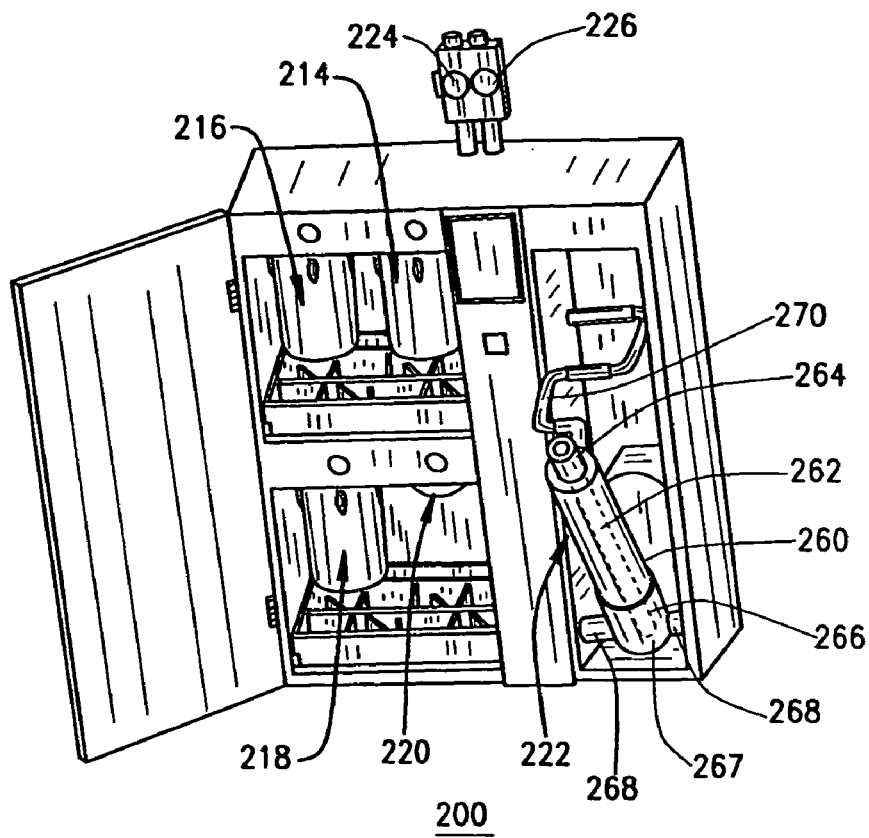
FIG. 14 is a perspective view of the alternative water treatment assembly shown in FIG. 13.

FIG. 14 is a perspective view of water treatment assembly 200 showing disinfection module 222 in an extended state or maintenance state. Disinfection module 222 is disengaged from latch 240, and is rotated outward from the operational state (shown in FIG. 13). In the extended state, disinfection module 222 may be accessed for maintenance or replacement.

Disinfection module 222 includes an elongated tube body 260 housing an elongated ultraviolet lamp or bulb 262 therein, an end cap 264 threadably coupled to a top end of tube body 260, and a rotatable cradle 266 for receiving the bottom end (not shown) of tube body 260. In an alternative embodiment, disinfection module 222 includes a filter element (not shown) that mechanically filters microbial contaminants from the water flowing therethrough.

Tube body 260 includes a water inlet (not shown) and a water outlet (not shown), and water is channeled through tube body 260. Ultraviolet lamp 262 is longitudinally positioned within tube body 260 for removing, killing or inactivating microbiological contaminants, such as bacteria, virus, cysts and protozoa from the water channeled through tube body 260. Ultraviolet lamp 262 is removable from tube body 260 along the length of tube body 260 for maintenance or replacement.

Water treatment assembly 200 includes at least one safety feature to protect a user from exposure to ultraviolet light from lamp 262. For example, a control switch (not shown) may be coupled to end cap 264 and may transmit a signal to the controller when end cap 264 is removed. As such, the controller restricts power to ultraviolet lamp 262 when end cap 264 is removed. The user is thus not exposed to ultraviolet light when the lamp 262 is removed. In another embodiment, water treatment assembly 200 includes a sensor interlock (not shown) on door 230, such that, when door 230 is opened, power to lamp 262 is restricted.

End cap 264 is threadably coupled to tube body 260, and is removable from tube body 260 for providing access to ultraviolet lamp 262 and/or the filter element received in tube body 260. Ultraviolet lamp 262 is fixed to end cap 264, when end cap 264 is disengaged with tube body 260, ultraviolet lamp 262 can be pulled out from tube body 260 together with end cap 264. Additionally, end cap 264 may engage with latch 240 (shown in FIG. 13) to retain disinfection module 222 in the retracted state (shown in FIG. 13), and end cap 264 may disengage with latch 240 to allow disinfection module 222 to rotate to the extended state. Alternatively, end cap 264 may separate from ultraviolet lamp 262, when end cap 264 is removed from tube body 260, ultraviolet lamp 262 can then be pulled out from tube body 260 for maintenance or replacement.

Cradle 266 includes a T-shaped tube 267 having two coaxially formed hubs 268 at ends of tube 267. Tube body 260 is seated within tube 267. Hubs 268 are rotatably mounted to posts (not shown) formed in disinfection module compartment 234. Cradle 266 may rotate with respect to the axis of hubs 268, sometimes referred to as the rotation axis, which facilitates disinfection module 222 rotating between the normal state (shown in FIG. 13) and the extended state. Tube 267 is coupled in flow communication with the various water treatment elements through a plumbing line (not shown) extending therethrough. Specifically, the plumbing line in tube 267 includes an inlet extending through one of hubs 268 and an outlet coupled to tube body 260. Water is channeled into tube body 260 through T-shaped tube 267. An o-ring seal (not shown) is positioned at the inlet of the plumbing line in tube 267, to prevent water leakage when tube 267 rotates together with cradle 266.

Disinfection module 222 further includes a plurality of plumbing lines 270 connected in series. Plumbing lines 270 are coupled in flow communication with each other, and are rotatable with respect to each other. One terminating plumbing line 270 is coupled with the water outlet of tube body 260, and another terminating plumbing line 270 is coupled with main outlet 226 or other water treatment elements. Plumbing lines 270 form a flexible flow path between disinfection module 222, and main outlet 226 or other water treatment elements. When disinfection module 222 is in the normal state (shown in FIG. 13), plumbing lines 270 rotate toward each other, and are retracted and positioned behind disinfection module 222 within disinfection module compartment 234. When disinfection module 222 is in the extended state, plumbing lines 270 rotate away from each other, and are substantially aligned with one another. A plurality of o-ring seals (not shown) are positioned between each plumbing line 270 to prevent water leakage. Alternatively, a plurality of slip ring seals may be positioned between each plumbing line 270. Also, plumbing lines 270 may be interconnected via a quick disconnect style connection, a flexible tube, or the like.

In operation, water supplied to main inlet 224 is channeled to particle filter module 214 for removing particulates, minerals, and other contaminants from the water channeled therethrough. Water is then channeled through taste and odor removal module 216 for removing chemicals such as chlorine, particles, and other contaminants causing reduced water quality relating to taste and/or odor of the water. Water is then channeled through lead and mercury removal module 218 for removing minerals, specifically lead and mercury, from the water. Water is then channeled through disinfection module 222 for removing, killing or inactivating contaminants such as bacteria, virus, cysts, other microbes, and the like from the water. Specifically, water is channeled through the plumbing line in tube 267, into tube body 260, and then through each plumbing line 270. Water is then channeled from disinfection module 222 to main outlet 226. It is appreciated that, water treatment elements of water treatment assembly 200 may be monitored and operated in a similar manner as water treatment assembly 10 (shown in FIG. 1), and the flow path of water treatment assembly 200 may be varied in alternative embodiments. For example, water may be channeled through a water softener (not shown) located outside water treatment assembly 200 before being channeled through disinfection module 222. Alternatively, water may be channeled to an alternative external water treatment device.

Figure 15:
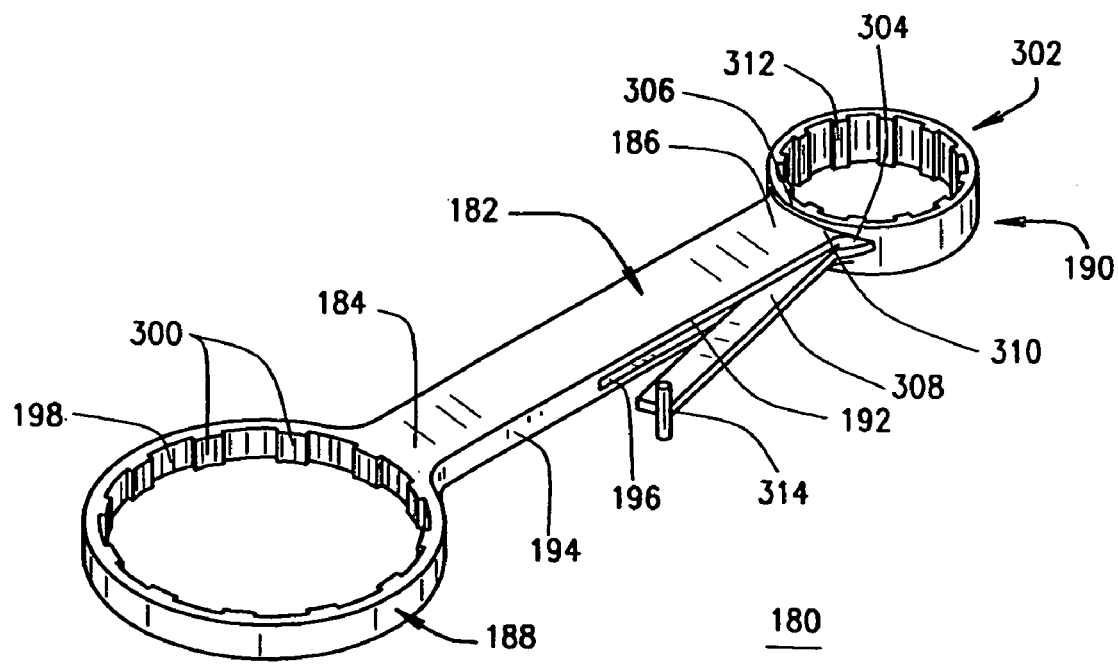
FIG. 15 is a perspective view of a filter wrench for use with the water treatment assemblies shown in FIGS. 1 and 13.

FIG. 15 is a perspective view of a filter wrench 280 for use with water treatment assemblies 10 and 200 shown in FIGS. 1 and 13. Filter wrench 280 includes a wrench body 282 extending between a first end 284 and a second end 286. A filter sump removal portion 288 is positioned at first end 284, and an end cap removal portion 290 is positioned at second end 286.

Wrench body 282 includes an elongated groove 292 defined along a longitudinal direction on a side face 294 thereof, and adjacent second end 286. Wrench body 282 also includes a rectangular recess 296 defined on side face 294 and adjacent groove 292.

Filter sump removal portion 288 is substantially ring-shaped, and includes a circumferential inner surface 298. Alternatively, filter sump removal portion 288 could include an open side such that portion 288 is c-shaped. A plurality of protrusions or teeth 300 extend inward from inner surface 298, and are spaced at a predetermined distance with respect to each other. Inner surface 298 is sized to fittingly surround filter sump 244 (shown in FIG. 13), and protrusions 300 are configured to engage holding ribs 246 (shown in FIG. 13) of filter sump 244. Ring-shaped filter sump removal portion 288 may be insert into filter compartments 232 and cooperate with filter sump 244, to rotate filter sump 244 with respect to filter support 242 (shown in FIG. 13), thus removing filter modules 214, 216, and 218 from water treatment assembly 200.

End cap removal portion 290 includes a substantially ring-shaped flexible portion 302 having a first end 304 and a second end 306. A lever 308 extends from first end 304 of flexible portion 302 and wrench body 282 extends from second end 306 of flexible portion 302. Alternatively, end cap removal portion 290 could include an open side such that portion 290 is c-shaped. End cap removal portion 290 is sized to receive end cap 264 (shown in FIG. 13) of disinfection module 222 (shown in FIG. 13).

Flexible portion 302 also includes a staggered inner surface 310 which is configured to surround and grasp end cap 264 of disinfection module 222. Lever 304 may rotate outward or inward to enlarge or reduce the size of flexible portion 302, and end cap removal portion 290 may be loosened or tightened about end cap 264 when flexible portion 302 surrounds end cap 264. End cap removal portion 290 may grasp and rotate end cap 264 for removal or replacement of end cap 264. In the exemplary embodiment, lever 304 further includes a rectangular head portion 312. Lever 304 may rotate into groove 292 of wrench body 282, and head portion 312 may be retained within recess 296. Lever 304 is rotated and secured into wrench body 282, which facilitates handling wrench body 282 when using filter sump removal portion 288 to mount or detach filter modules. A filter wrench 280 is thus provided which can provide maintenance to water treatment assembly 10 or 200 by use of a single tool. Specifically, filter wrench 280 has multiple sized ends for removing various sized components of water treatment assembly 10 or 200.

The above-described assembly provides a cost-effective and reliable method and apparatus for water treatment. Specifically, the modular design of the water treatment assembly allows a user to treat the water and particular contaminants within the water which may be specific to that user. The assembly includes a controller and a plurality of sensors to facilitate maintaining, repairing and replacing each of the components of the assembly on an as-needed basis.

Exemplary embodiments of water treatment assemblies are described above in detail. It is to be understood that the invention is not limited to the specific embodiments described herein, but rather each component may be utilized independently and separately from other components described herein. Each component can also be used in combination with other water treatment assemblies.

While the invention has been described in terms of various specific embodiments, those skilled in the art will recognize that the invention can be practiced with modification within the spirit and scope of the claims.

What is claimed is:

1. A modular water treatment system comprising:
   at least two filter components selected from a group comprising a particulate filter component, a taste and odor filter component, a lead and mercury filter component, in combination with a water softener component, and a water disinfection component, each of said at least two filter components comprising a separate modular filter compartment and a catch basin to collect spilled water resulting from replacement of said filter component within said modular filter compartment;
   a plurality of interfaces for coupling to said components;
   plumbing lines providing flow communication between said components, said plumbing lines comprising a system water inlet and a system water outlet;
   a controller configured to control the flow of water through said system;
   one or more sensors configured to repeatedly transmit a signal representing a sensor value to said controller, wherein said controller is configured to detect a faulty sensor; and
   a by-pass valve configured to water bypassing one or more of said components responsive to sensor output.

2. A modular water treatment system in accordance with claim 1 wherein said sensor being configured to transmit a signal relating to a characteristic of the water within said system.

3. A modular water treatment system in accordance with claim 1 wherein said sensor configured to transmit a signal to said controller relating to at least one of a temperature of the water within said system, a flow rate of the water within said system, a pressure of the water within said system, and a turbidity level of the water within said system.

4. A modular water treatment system in accordance with claim 1 wherein said sensor configured to transmit a signal relating to an operating characteristic of at least one of said water treatment components.

5. A modular water treatment system in accordance with claim 1 further comprising a valve for controlling flow of water to one of said selected water treatment components, said controller operatively coupled to said valve.

6. A modular water treatment system in accordance with claim 1 further comprising multiple sensors positioned upstream and downstream of at least one of said water treatment components and cooperating to sense changes in a water characteristic of the water flowing through said one of said selected water treatment components.

7. A modular water treatment system in accordance with claim 1 wherein said controller is configured to diagnose an operational status of at least one of said water treatment components.

8. A modular water treatment system in accordance with claim 1 further comprising a display coupled to said controller.

9. A modular water treatment system in accordance with claim 1 further comprising a user interface coupled to said controller.

10. A modular water treatment system in accordance with claim 1 further comprising an alarm coupled to said controller, said controller configured to activate said alarm based on the signal transmitted from said sensor to said controller.

11. A modular water treatment system comprising:
    at least two filter components selected from a group comprising a particulate filter component, a taste and odor filter component, and a lead and mercury filter component, each of said at least two filter components comprising a separate modular filter compartment and a catch basin to collect spilled water resulting from replacement of said filter component within said modular filter compartment;
    a water disinfection component comprising an ultraviolet lamp;
    a plurality of interfaces for coupling to said at least two selected filter components and said water disinfection component;
    plumbing lines providing flow communication between said at least two selected filter component and said water disinfection component, said plumbing lines comprising a system water inlet and a system water outlet;
    a controller configured to control the flow of water through said system;
    one or more sensors configured to repeatedly transmit a signal representing a sensor value to said controller, wherein said controller is configured to detect a faulty sensor; and
    a by-pass valve configured to water bypassing one or more of said components responsive to sensor output.

12. A modular water treatment system in accordance with claim 11 wherein said sensor configured to transmit a signal relating to a temperature of the water.

13. A modular water treatment system in accordance with claim 12 further comprising a drain line coupled to said water disinfection component and a drain line valve coupled to said controller, said controller opening said drain line valve when the temperature of the water is above a predetermined level.

14. A modular water treatment system in accordance with claim 13 wherein said valve is opened for a predetermined amount of time.

15. A modular water treatment system in accordance with claim 13 wherein said valve is opened to discharge a predetermined amount of water.

16. A modular water treatment system in accordance with claim 13 wherein said valve is opened until the temperature of the water sensed by said sensor is below a predetermined temperature.

17. A modular water treatment system in accordance with claim 12 further comprising a system water outlet valve coupled to said controller, said controller closing said system water outlet valve when the temperature of the water is above a predetermined temperature.

18. A modular water treatment system in accordance with claim 12 further comprising a water disinfection component cooling system configured to reduce a temperature of the water within said water disinfection component, said water disinfection component cooling system comprising a fan operatively coupled to said controller, said controller operating said fan when the temperature of the water is above a predetermined temperature.

19. A modular water treatment system in accordance with claim 11 wherein said sensor configured to transmit a signal relating to an amount of water flow through said water disinfection component, said system further comprising a drain line coupled to said water disinfection component and a drain line valve coupled to said controller, said controller opening said drain line valve when the amount of water channeled through said water disinfection component over a predetermined amount of time is below a predetermined amount.

20. A modular water treatment system in accordance with claim 11 wherein said sensor configured to transmit a signal relating to a lamp intensity of said ultraviolet lamp.

21. A modular water treatment system in accordance with claim 20 wherein said controller configured to measure a lamp degradation by comparing said sensed lamp intensity over a predetermined time period.

22. A modular water treatment system in accordance with claim 20 further comprising a second signal transmitted from one of said sensor and a second sensor, said second signal transmitted to a second controller, said second controller configured to operate said water treatment system based on said second signal.

23. A modular water treatment system in accordance with claim 11 wherein said sensor configured to transmit a signal relating to an amount of microbes passing through said water disinfection component, said controller configured to change an operating intensity of said ultraviolet lamp based on the signal from said sensor.

* * * * *